United States Patent [19]

Woods

[11] 4,383,892
[45] May 17, 1983

[54] SOLAR ASSIST FOR THE LIFTING, PURIFICATION AND STORAGE OF WATER

[76] Inventor: Edwin K. Woods, 1642 Edith Esplanade, Cape Coral, Fla. 33904

[21] Appl. No.: 83,731

[22] Filed: Sep. 10, 1979

Related U.S. Application Data

[63] Continuation-in-part of Ser. No. 799,841, May 23, 1977, abandoned.

[51] Int. Cl.³ ............................................. B01D 3/10
[52] U.S. Cl. .............................. 203/11; 203/DIG. 14
[58] Field of Search ............ 159/2 R, 15, 24 A, 47 R, 159/DIG. 16; 202/205, 234, 262; 203/11, 91, DIG. 1, DIG. 14; 126/425, 427, 452

[56] References Cited

U.S. PATENT DOCUMENTS

| | | | |
|---|---|---|---|
| 1,700,675 | 1/1929 | Goddard | 126/271 |
| 2,006,985 | 7/1935 | Claude et al. | 203/10 |
| 3,088,882 | 5/1963 | Justice | 202/234 |
| 3,206,380 | 9/1965 | Davial | 203/11 |
| 3,248,305 | 4/1966 | Williamson | 203/11 |
| 3,288,685 | 11/1966 | Kempter | 203/11 |
| 3,318,784 | 5/1967 | Murphy | 202/205 |

*Primary Examiner*—Hiram H. Bernstein

[57] ABSTRACT

This invention utilizes distillation to purify water but instead of the usual application of heat to boil the water and then condense it, heat is applied to a relatively small quantity of water which is confined until it is superheated. When the pressure reaches a pre-set level the water is released allowing sudden expansion to a vapor to create a high velocity directed through a venturi to suck water from the main body of water lifting it into an expansion chamber located at the elevation above the main body of water equaling the maximum lift by suction. The vapor is then led through a heat exchanger where it will circulate until it is condensed. Some of the condensate will replenish the water to be heated while the remainder is led around the vacuum chamber to heat the water therein and then to storage. In-as-much as a vacuum system is used to lift the water, the lower end of the vacuum chamber may be left open to the source of the water, which may be the ocean, and the concentrated pollutants will disburse back to the source and keep the fouling of the inside of the vacuum system to a minimum. Flow resistance is utilized to aid in separating the higher concentration of pollutants in the vacuum chamber from the polluted water freshly arriving.

2 Claims, 6 Drawing Figures

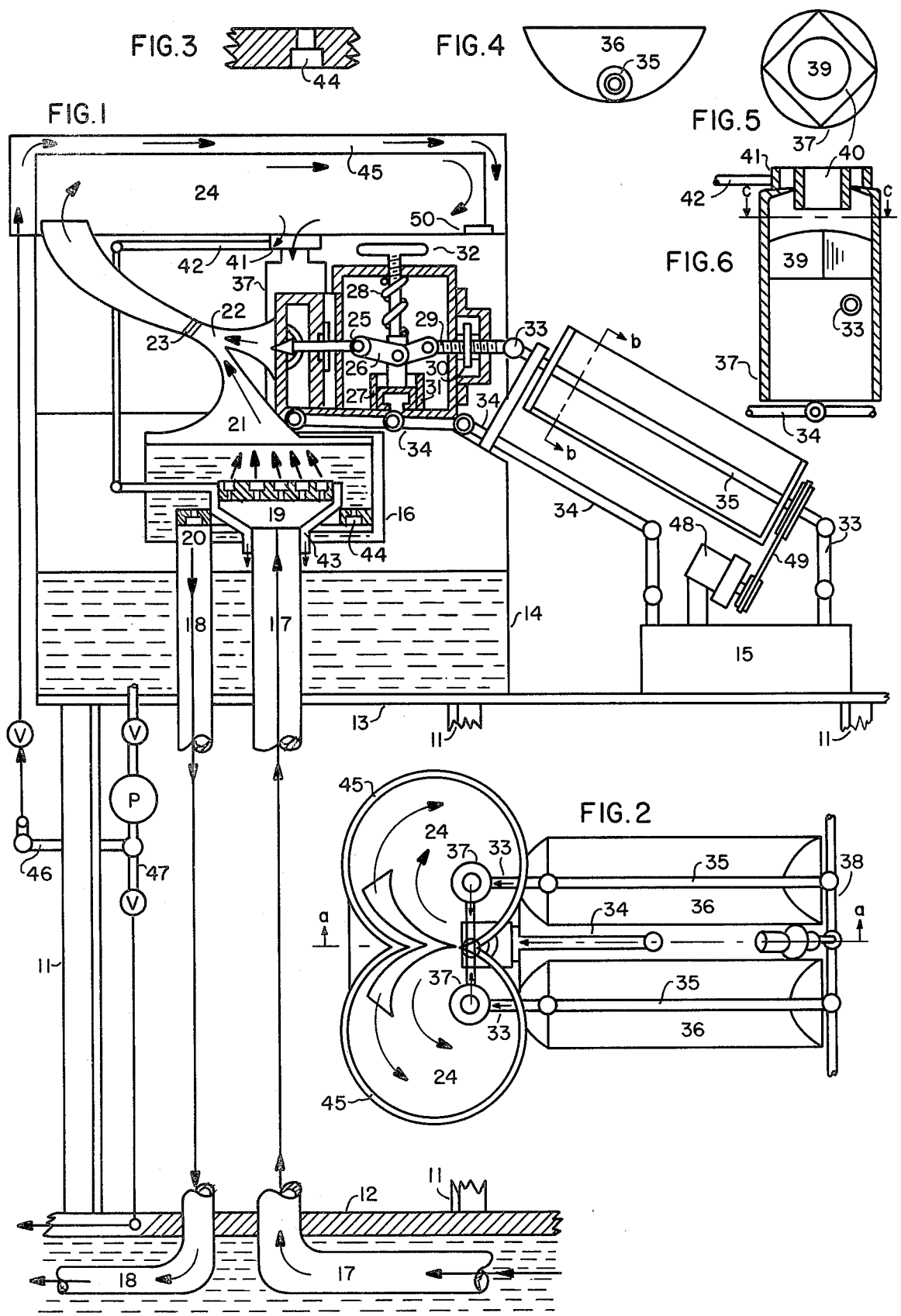

SOLAR ASSIST FOR THE LIFTING, PURIFICATION AND STORAGE OF WATER

This application is a Continuation-In-Part of Ser. No. 799,841, May 23, 1977, abandoned.

SUMMARY OF THE INVENTION

This invention discloses a process where water is distilled when it reaches the limit of maximum lift under a vacuum leaving the pollutants to return to the original source and storing the distilled water for distribution. Equipment has been devised to carry out the process. A solar heating system has been devised to make the operation more economical.

IN THE DRAWINGS

FIG. 1 is a diagramatical representation as would be seen along line a—a of FIG. 2, showing an enlarged control valve in section.

FIG. 2 is a diagramatic plan with the top of the heat exchanger off.

FIG. 3 is a section through a flow control device.

FIG. 4 is an end view of one of the half lens parabolic reflectors.

FIG. 5 is a diagramatic representation of a float valve along c—c of FIG. 6.

FIG. 6 is a section through the heater refill tank and its connection.

DETAILED DESCRIPTION

Supports 11 mounted on dock 12 support deck 13 carrying storage tank 14 and heater 15. Inside the storage tank is the expansion chamber 16 which has the main supply line 17 and the return line 18 sealed therein. These lines are equipped with headers 19 and 20 respectively. The upper part of the expansion chamber 21 leads to a venturi 22 with an exit through the check valve 23 to the heat exchanger 24. Powering the expansion is valve 25. It releases high velocity vapor or steam into the venturi to create the suction. This valve is operated by toggle 26 tripped by piston 27 working against adjustable tension spring 28 and controlled by adjustable toggle pressure 29 controlled by hand wheel 30. The piston 27 operates in cylinder 31. The tension of spring 28 controlled by hand wheel 32 also influences the resetting of the toggle. There are two sources of energy for this operation, the heater or boiler 15 which supplies hot water under pressure through pipes 33 and 34. Mounted on the straight portions 35 of pipes 33 are journaled parabolic half lenses 36 which are driven by motor and reduction gears 48 and V belts 49 so as to turn with the sun while the sun is focused on the pipes. Adjustment of the pipes to keep them normal to the suns rays may be required if the installation is far from the tropics. The pipes should always be oriented north and south. Additional pipes may be connected to pipe 38 to increase the capacity. The control valve will operate with either or both heating systems operating.

Mounted under the heat exchanger are filling tanks 37. These tanks are connected to both lines 33 and 34 and are also connected to the heat exchanger 24. Under normal operating conditions the heating system is refilled from the heat exchanger through opening 49 and when full, valve 39, which floats, will rise and close the opening sealing it with a ground fit so it can withstand high pressure. When the pressure drops valve 39 will drop and the heating system will again refill. When the tank is full any additional water in the condenser will be guided by collar 41 around opening 40 into pipe 42 which feeds the water to jacket 43 surrounding the header to warm that water and then to storage, in the main tank 14. A cooling jacket is placed around the heat exchanger area 24 as shown at 45 and provision is made to recirculate the vapor to be sure condensation is complete. Provision is made for cooling the water jacket 45 from the supply line 46 which is connected to the main output line 47. This may also be used to fill the hot water system at the start of operations through outlet 50.

FIG. 3 shows a cross-section taken in the header 20 as an enlarged view so as to show the shoulders 44 on the passage way. These passage ways are shown in an inverted position in header 19. Although these passage ways are open to almost the same pressure on both sides of the opening there will be a tendency for the water to flow better in one direction than in the other direction because the shoulder will tend to reflect the motion of the water when the motion is against the shoulder thus serving to retard its movement in that direction. Thus at 20 there will be less resistance to water going down pipe 18 and at 19 there will be less resistance to the flow going into evaporator 16. There is bound to be a great deal of up and down motion in the evaporator when the water is boiling during evaporation. The water freshly arriving should have a tendency to come into the evaporator through header 19 and the water with the more polutants that has been in the evaporator longer should tend to leave by 18.

OPERATION

To start operations, water can be supplied from line 47 through line 46 through cooling jacket 45 and opening 50 to the heat interchange 24. From there it would be like normal with the water draining from 24 through opening 40 to tank 37 to pipes 33 and 34 of the heating system. When the heater is full tank 37 will fill, which closes float valve 39. Check valve 23 and pressure valve 25 will normally be closed, sealing water in the system. Heat may be applied from boiler 15 or reflectors 36 or both at the same time. Being sealed off, the heater water confined with become superheated depending on the pressure set on the toggle through spring 28 and screw 29. When the pressure on piston 27 is sufficient to overcome these pressure settings the toggle will operate, opening valve 25 sending a blast of steam to open check valve 23 through the venturi and creating a vacuum in the expansion chamber and sucking polluted water from under the dock and up into the expansion chamber. When the water is in the expansion chamber it is at the limit to which it may be lifted by vacuum and then it boils as more suction is applied. When the vapor is condensed it has been purified by distillation. It will recycle itself repeatedly as long as heat is applied.

I claim:

1. A cyclic process for lifting, vaporizing and storing of water consisting of the use of high velocity vapors to create a low pressure area high over a body of poluted water, the height being such that the water raised due to the low pressure is completely vaporized when it arrives at that area and the vapors are steered to where they condense and become distilled water, while leaving behind water at a slightly lower level that has become more poluted because of the vaporization and returning that water to the original body of water, part of the distilled water is confined and superheated until it's internal pressure forces it's release at high velocity recreating the low pressure area, thus restarting the cycle, surplus distilled water is stored.

2. In an apparatus for lifting, evaporating and storing of water on a cyclic basic, a vacuum chamber located at an elevation above a body of poluted water and having a double connection to the body of water and operating on fluxuations in pressure in the vacuum chamber to keep the concentration of polutants low, with means in one connection assisting the flow of water into the vacuum chamber and means in the other connection assisting the return flow to the body of water, the elevation of the vacuum chamber above the body of water being greater than water can be lifted by a vacuum as water without boiling it, ejector means connected to the vacuum chamber above the boiling level to create the vacuum and direct the resulting vapor through a check valve to a condenser where the vapor is converted to distilled water, means directing part of the distilled water through another check valve to where it is confined in the heating system and heated to a high temperature and pressure while confined between the last check valve and the ejector relief valve until it is released by it's own internal pressure with a blast that is directed into the ejector where it creates the vacuum in the vacuum chamber to start another cycle, excess distilled water is stored.

* * * * *